No. 870,692. PATENTED NOV. 12, 1907.
J. L. B. SHEPARD.
SPRING GEAR FOR VEHICLES.
APPLICATION FILED AUG. 25, 1906.
4 SHEETS—SHEET 1.
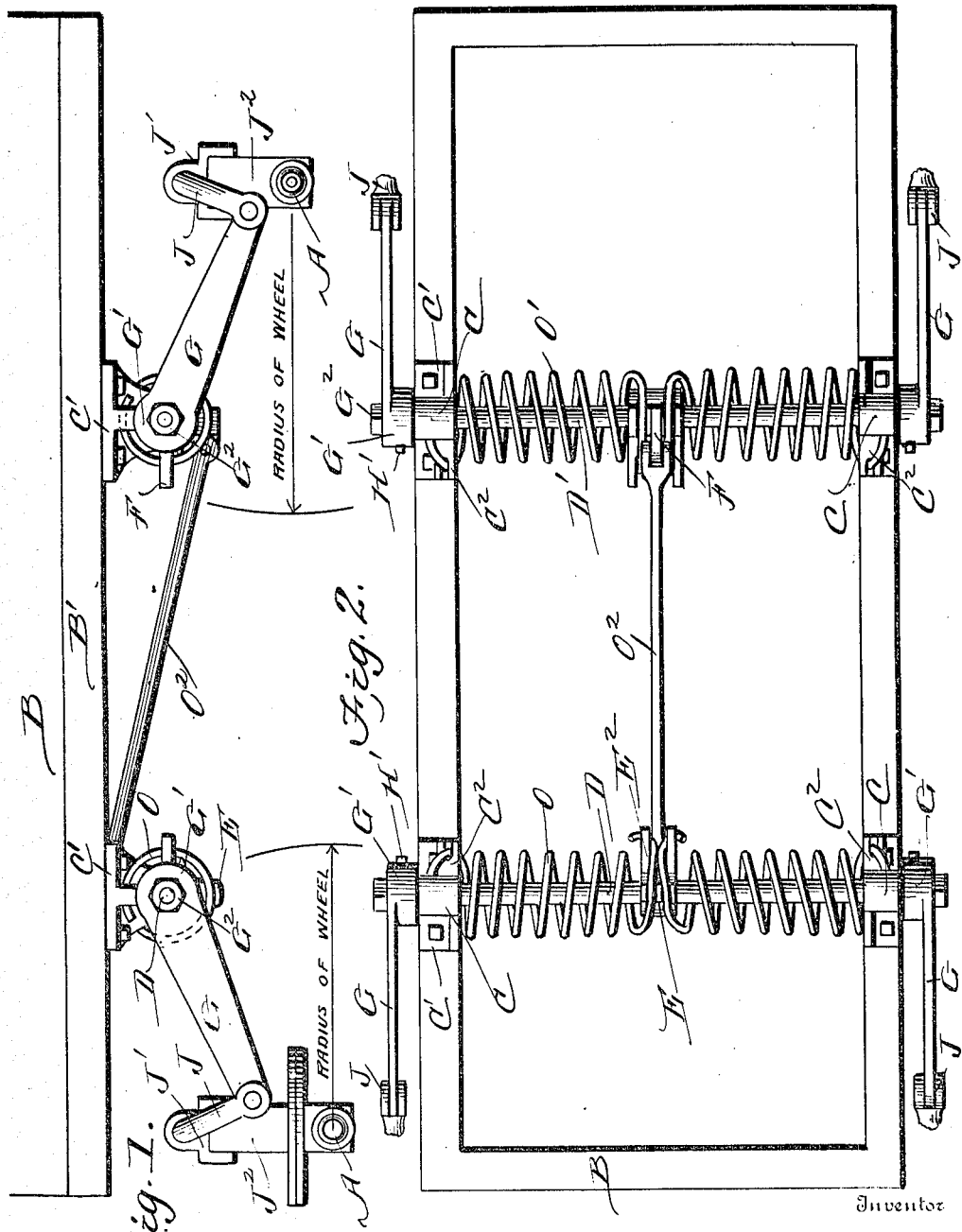

No. 870,692. PATENTED NOV. 12, 1907.
J. L. B. SHEPARD.
SPRING GEAR FOR VEHICLES.
APPLICATION FILED AUG. 25, 1906.
4 SHEETS—SHEET 2.
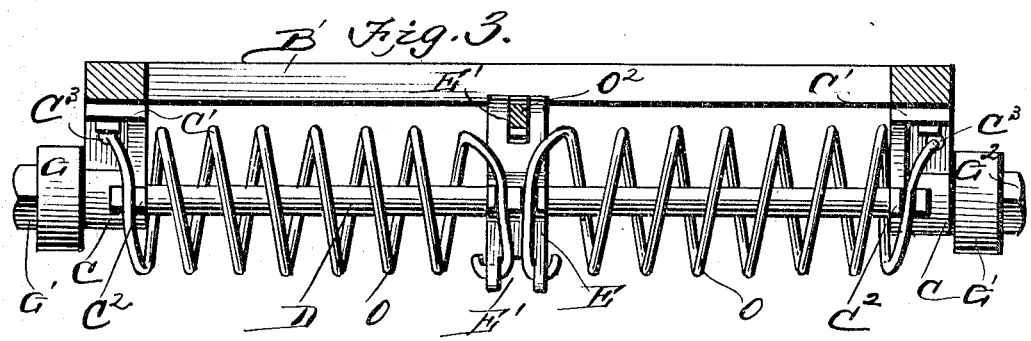
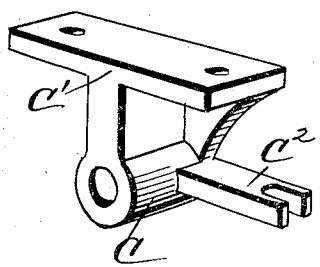
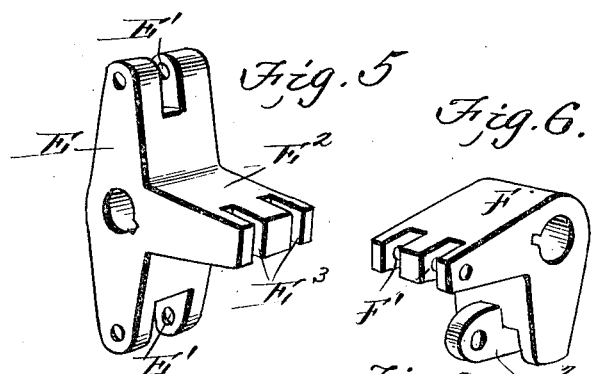
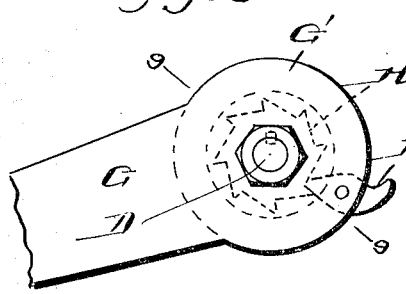
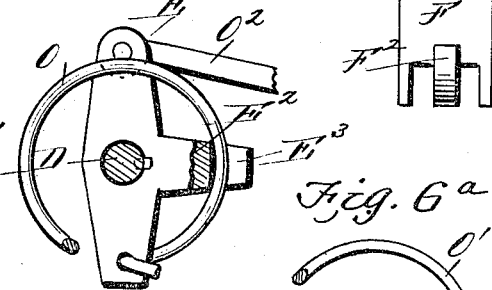
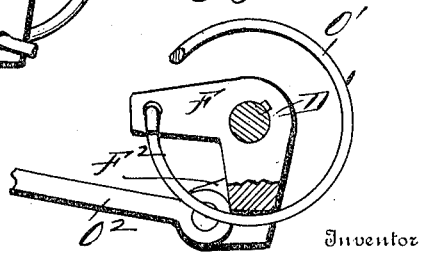
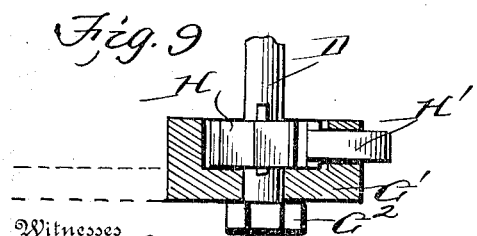
Witnesses
Inventor
J. L. B. Shepard,
By O'Meara & Brock
Attorneys

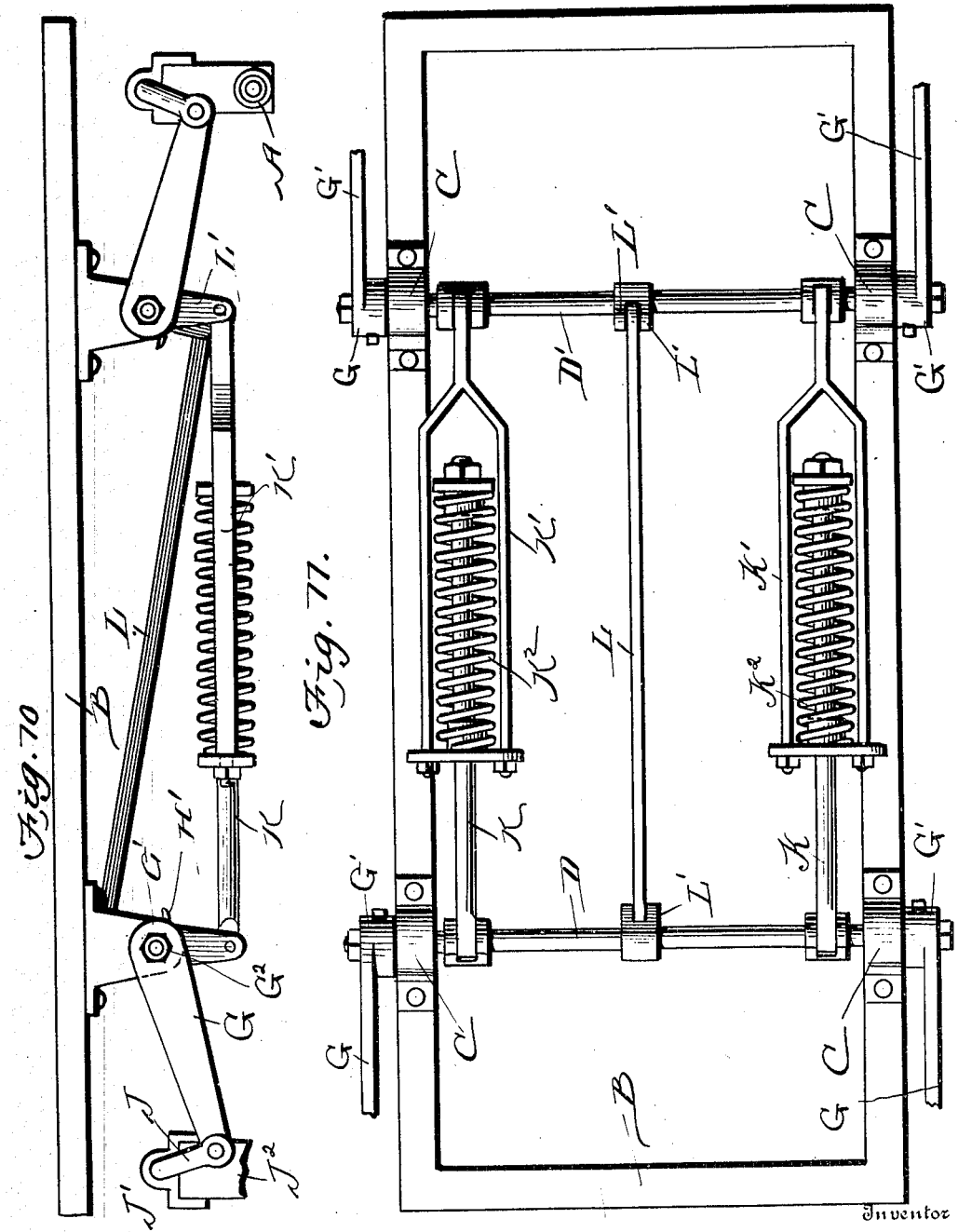

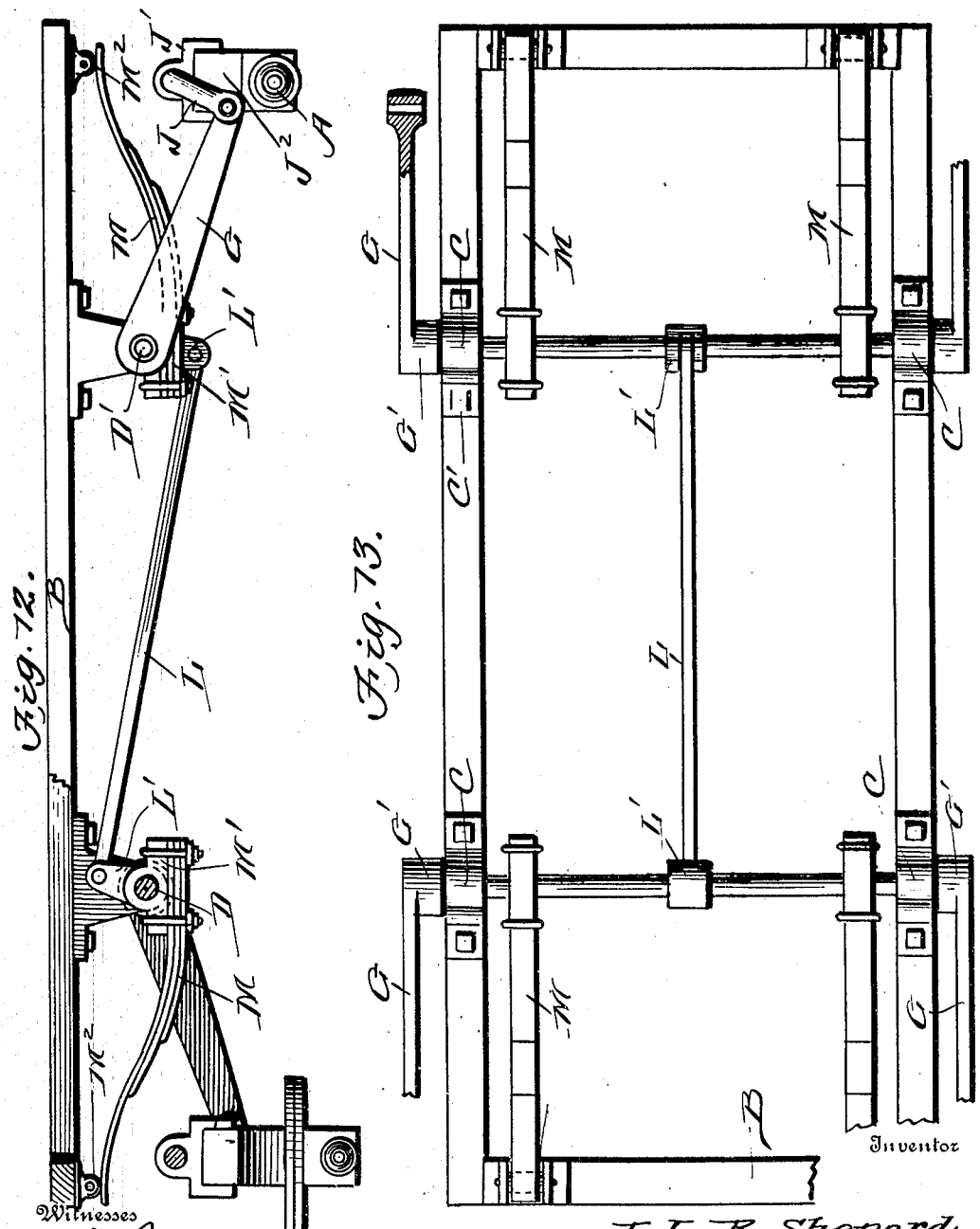

UNITED STATES PATENT OFFICE.

JAMES L. B. SHEPARD, OF GRAYVILLE, ILLINOIS, ASSIGNOR OF ONE-FIFTH TO WILLIAM M HALL, OF GRAYVILLE, ILLINOIS.

SPRING-GEAR FOR VEHICLES.

No. 870,692.  Specification of Letters Patent.  Patented Nov. 12, 1907.

Application filed August 25, 1906. Serial No. 332,024.

*To all whom it may concern:*

Be it known that I, JAMES L. B. SHEPARD, a citizen of the United States, residing at Grayville, in the county of White and State of Illinois, have invented a new and useful Improvement in a Spring-Gear for Vehicles, of which the following is a specification.

This invention relates to an adjustable combination spring gear for automobiles and other vehicles.

The object of the invention is a spring gear comprising an equalizing bar which will carry the body of the vehicle level with respect to the rear axle and also with the reach lengthwise under all conditions of road and without regard to what portion of the body the load is placed upon. Also to provide such a spring gear of an adjustable nature with respect to the load.

A further object of the invention is the combination with the springs of an equalizing bar whereby the load will be distributed upon all of the springs irrespective of the position occupied by the load in the vehicle. Still further objects are to provide a spring gear for vehicles which will prevent the locking of the front wheels under the body as is sometimes the case in heavy loaded freight wagons standing on uneven ground thereby causing the body to sag to the lower side, bearing upon one of the wheels and preventing a short turn being made. Furthermore to provide a device of the kind in which if a portion of the springs become broken the load will be carried by the remaining springs and in case of breaking of all of the springs the body will still be held above the wheels.

A device of this kind will be found useful and convenient where it is necessary or desirable to place a heavier load upon one part of a body than another has for example, in loading driving mechanism and engines upon automobiles.

The invention consists of the novel features of construction hereinafter fully set forth, pointed out in the claims and shown in the accompanying drawings, in which, Figure 1 is a side elevation of my gearing, the lower portion of a vehicle body being also shown. Fig. 2 is an inverted plan view of the bottom of a vehicle with my gear attached thereto. Fig. 3 is a transverse section through a frame carried by the vehicle and through an equalizing bar, a shaft and spring being shown in elevation. Fig. 4 is a detail perspective view of a shaft bearing. Fig. 5 is a detail perspective view of a spring connection or rock lever. Fig. 5$^a$ is a side view of the rock lever, a portion of the same and a shaft being in section. Fig. 6 is a detail perspective view of a bell crank lever. Fig. 6$^a$ is a side elevation of the bell crank lever and connected parts, portions being in section. Fig. 7 is an end view of Fig. 6. Fig. 8 is a side elevation of an arm and bearing, carried by the arm, a portion of the arm being broken away. Fig. 9 is a section on the line 9—9 of Fig. 8. Fig. 10 is a side elevation of a modification. Fig. 11 is an inverted plan view of Fig. 10. Fig. 12 is a side elevation of an additional modification. Fig. 13 is an inverted plan view of Fig. 12.

In these drawings A represent the vehicle axles, B the body and B' a rectangular frame secured to the body B. Suitable bearings C are placed upon the frame B' and these bearings one of which is shown in detail in Fig. 4, consists of a plate C' to which the bearing C is connected by means of a web and the sleeve carries an arm C$^2$ bifurcated at its free end, and the web is perforated as shown at C$^3$ in Fig. 3. Two parallel shafts D and D' are mounted in the bearings C and the shaft D carries a rock lever E bifurcated at its ends as shown at E' and also provided with transverse perforations in the bifurcated portions. The rock lever is also provided intermediate its ends with a projection E$^2$ which is provided with two slots E$^3$ at its free end. The shaft D' carries a bell crank lever F one end of which is slotted as shown at F' while the other end carries a perforated lug F$^2$ parallel to the slotted member. Both the levers E and F are keyed to their respective shafts. Arms G have an enlarged end portion G' which is counterbored to form a housing for a ratchet H and slotted as shown in Fig. 9 to permit a pawl H' to engage the ratchet H.

The arms G are mounted respectively, upon the outer ends of the shafts D and D'. A link J is pivoted to the free end of each arm G and these links are pivotally held in suitable bearings J' mounted upon the vehicle bolsters J$^2$.

Upon the shaft D are mounted two coil springs O, arranged end to end and the outer ends of these springs are carried through the bifurcation of the arm C$^2$ and through the perforations C$^3$ as shown in Fig. 3. The inner end portions of these springs are connected to the rock lever E by passing them through the slots E$^3$ and securing them in the perforations in the lower bifurcated portion of the lever. Springs O' are carried in the same manner by the shaft D' and at their inner ends they are held in transverse perforations formed in the slotted members of the bell crank as shown in Fig. 6$^a$.

An equalizing bar O$^2$ has its upper end pivotally connected in the bifurcation E' at the upper end of the lever E and the lower end of said lever is bifurcated to engage the lug F$^2$, of the bell crank lever F. In Fig. 10 I have shown a modified form in which the springs are arranged lengthwise of the vehicles instead of transverse to the body. In this form rods K are secured at one end to the shaft D and frames K' are secured at one end to the shaft D' and the rods K work through free ends of the frame and springs K² are arranged upon said rods within the frames.

An equalizing bar L is pivotally connected in its ends to levers L' carried by the shaft D and D' and extending upwardly and downwardly respectively. The same equalizing bar L and levers L' are shown also in Figs. 12 and 13 where I have shown another form of spring. In these figures M represents a common form of carriage and wagon spring which is carried by a suitable stirrup M' supported upon shafts D and D' and the free ends of these springs M engage rollers M² carried by ends of the frame B'. In all of these forms one real difference is in the form of arrangement of the spring used, the operation being substantially the same. The arms G are loose upon the shafts but are held in place by means of nuts G². By loosening the nuts ratchets may be freely rotated thus adjusting the relative positions of the levers carried by the shafts, after which adjustment the nuts are again tightened. It is thought that it will be obvious from the above description and drawings that any load thrown upon one portion of the vehicle, as for example, above the shaft D' will have a tendency to swing the arms G attached thereto, thus causing the ratchets to rotate and swinging the lever carried by said shaft, and this movement will be transmitted by the equalizing bar to the other shaft and to the springs carried thereby. The load will therefore be equally distributed upon all of the springs and in no case can the vehicle body drop upon the wheels through the breaking of a spring.

Having thus fully described my invention, what I claim as new and desire to secure by Letters Patent, is:—

1. A spring gear of the kind described comprising shafts, arms mounted upon said shaft, ratchets, pawls carried by the arms, and in engagement with the ratchets, links pivotally carried by bolsters and connected to the arms, an equalizing bar, levers keyed to the shafts and pivotally connected to the ends of said bar and springs supported by said shafts.

2. A vehicle gear of the kind described comprising vehicle springs, parallel shafts, ratchets carried by the shafts, arms carried by the shafts, links pivotally mounted upon portions of the vehicle and pivotally connected to said arms, pawls carried by said arms and adapted to engage the ratchets, and an equalizing bar extending between the shafts and pivotally connected to the shafts, the ends of the bar being in different and horizontal planes.

3. A device of the kind described comprising vehicle springs, parallel shafts supporting said springs, levers secured to said shafts, an equalizing bar pivotally connected at its ends to said levers, one end of the bar being in a higher plane than the other, ratchet wheels carried by said shafts, arms carried by the shafts, pawls carried by the arms and adapted to engage the ratchets, and means for pivotally connecting the free ends of the arms to the portions of the vehicle body.

4. A device of the kind described comprising parallel shafts, levers carried by said shafts, an equalizing bar pivotally connected at its ends to said levers, one end of the bar being in a higher plane than the other, coil springs arranged end to end upon said shafts, the outer ends of the springs being connected to a fixed support and the inner ends being connected to the levers, arms carried by the shafts, ratchets carried by the shafts, pawls carried by the arms adapted to engage the shaft, and links pivotally supported from a part of the vehicle and pivotally connected to the ends of the arms.

5. A device of the kind described comprising parallel shafts, bearings carried by a vehicle body for said shafts, a rock lever keyed to one of said shafts, a bell crank lever keyed to the other shaft, an equalizing bar pivoted at one end to the upper end of the rock lever and at the opposite end to the depending member of the bell crank, coil springs surrounding said shafts, and having their outer ends secured to the bearings and their inner ends to said levers, respectively, arms loosely mounted upon said shafts, ratchets on said shafts, pawls carried by the arms adapted to engage the ratchets, bearings carried by the vehicle bolsters, links pivotally connected to said bearings and also to the arms and nuts working upon the shaft and adapted to lock the arms with respect to the shafts.

JAMES L. B. SHEPARD.

Witnesses:
 GEO. BEEBE,
 W. F. TAYLOR.